United States Patent [19]
Crick

[11] 4,093,341
[45] June 6, 1978

[54] OPTICAL FIBER CONNECTOR

[75] Inventor: Aubrey M. Crick, Epping, England

[73] Assignee: International Standard Electric Corporation, New York, N.Y.

[21] Appl. No.: 685,115

[22] Filed: May 10, 1976

[30] Foreign Application Priority Data

Jun. 19, 1975 United Kingdom ............... 26105/75

[51] Int. Cl.² .............................................. G02B 5/14
[52] U.S. Cl. ............................................. 350/96.21
[58] Field of Search ........................................ 350/96 C

[56] References Cited

U.S. PATENT DOCUMENTS

| 3,982,815 | 9/1976 | Nakayama | 350/96 C |
| 3,989,567 | 11/1976 | Tardy | 350/96 R X |
| 4,050,783 | 9/1977 | Tardy | 350/96 C |

OTHER PUBLICATIONS

R. M. Hawk, F. L. Thiel, "Low Loss Splicing and Connection of Optical Waveguide Cables", Proceedings of the Society of Photo-Optical Engineers Guided Optical Communications, vol. 63, Aug. 1975, 109-113.

Primary Examiner—John K. Corbin
Assistant Examiner—Rolf Hille
Attorney, Agent, or Firm—Thomas L. Peterson

[57] ABSTRACT

A multi-way optical fiber connector in which optical fibers terminating in ferrules are located in the connector in the interstices of a resiliently mounted stack of rods. Each ferrule contacts the rods, along three lines instead of the whole of its periphery reducing the insertion force required for an interference fit.

4 Claims, 3 Drawing Figures

OPTICAL FIBER CONNECTOR

BACKGROUND OF THE INVENTION

This invention relates to an optical fiber multi-way connector.

In an optical fiber connector there needs, on account of the very small diameter of an optical fiber, to be very critical alignment of the end of each fiber with its counterpart in a co-operating connector. This alignment is achieved by the provision, in both connectors, of reference surfaces relative to which the positions of the fibers are accurately known. These reference surfaces are mechanically brought into alignment as the connectors are mated. In principle, the reference surfaces could be provided by the bare fibers themselves, but in practice this would be difficult on account of their extreme fragility. Instead, it is usually preferred to provide each optical fiber end with a larger, more robust, reference surface in the form of a ferrule. Such a ferrule is a tubular structure, normally made of metal, into one end of which an optical fiber is inserted and secured so that at the other end of the ferrule the fiber and ferrule axes are accurately aligned. In this context, it is to be noted that a plastic coated optical fiber is not necessarily concentric within its plastic coating, and hence care must be taken to insure that in the securing of a ferrule to a plastic coated optical fiber, the alignment of the ferrule is determined with reference to the fiber itself rather than with reference to its coating. The purpose of the present invention is to provide a multi-way connector for accurately aligning and coupling a plurality of pairs of optical fibers with a relatively low insertion force.

SUMMARY OF THE INVENTION

According to the principal aspect of the present invention, there is provided an optical fiber multi-way connector including a shell in which there are mounted in a resilient lining an assembly of aligned rods having cylindrical surfaces dimensioned to provide a plurality of tricuspid interstices that are each defined by the meeting together of three of said cylindrical surfaces. Each optical fiber is secured inside a ferrule to terminate at one end thereof with the fiber axis aligned with the ferrule axis. The ferrules are located in said tricuspid interstices in which they each have a slight interference or friction fit.

A feature of such connector is that the ferrules are located by three lines of contacts between the ferrule and its locating rods. This may be contrasted with a location system in which the ferrules are fitted into sleeves providing contact around the whole ferrule periphery. With the sleeve system, both the sleeve diameter and the ferrule diameter have to be held to very close tolerances in order to achieve an interference fit that can be relied upon not to produce too much resistance to movement of each ferrule into or out of its associated sleeve. With the tricuspid interstices system of the present invention, the friction is reduced because the regions of contact are limited. The tolerances are less critical firstly by virtue of the fact that the locating rods are mounted inside a resilient lining in the connector shell, and secondly by virtue of the geometry. The effect of the geometry may be understood by reference to the special case in which the locating rods are all of equal diameter. In these circumstances, it may readily be verified that a given percentage change in rod diameter produces less than a sixth of that percentage change in the diameter of a ferrule that just fits in the interstices between the rods.

DESCRIPTION OF THE PREFERRED EMBODIMENT

Figure 1:
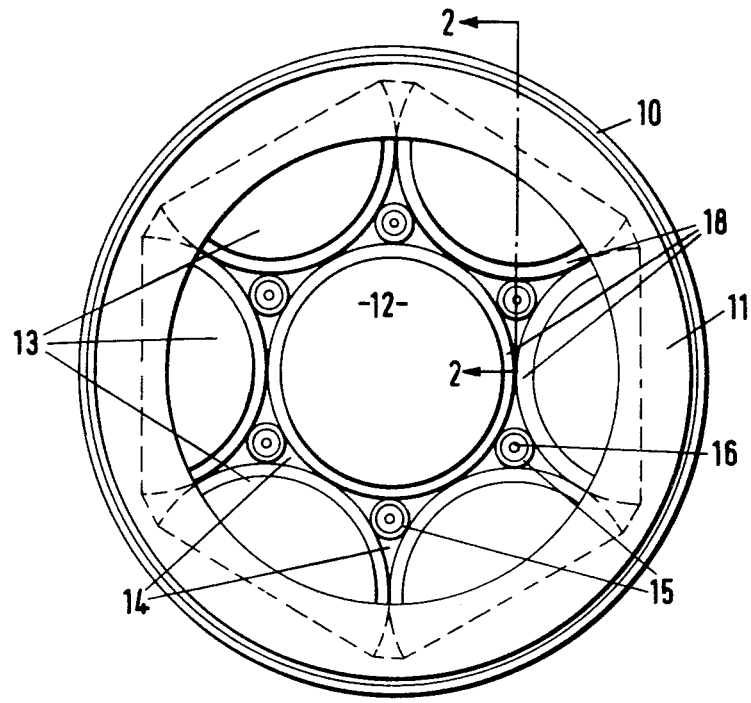
FIG. 1 is a front end view of one connector member of the connector of the invention.
Figure 2:
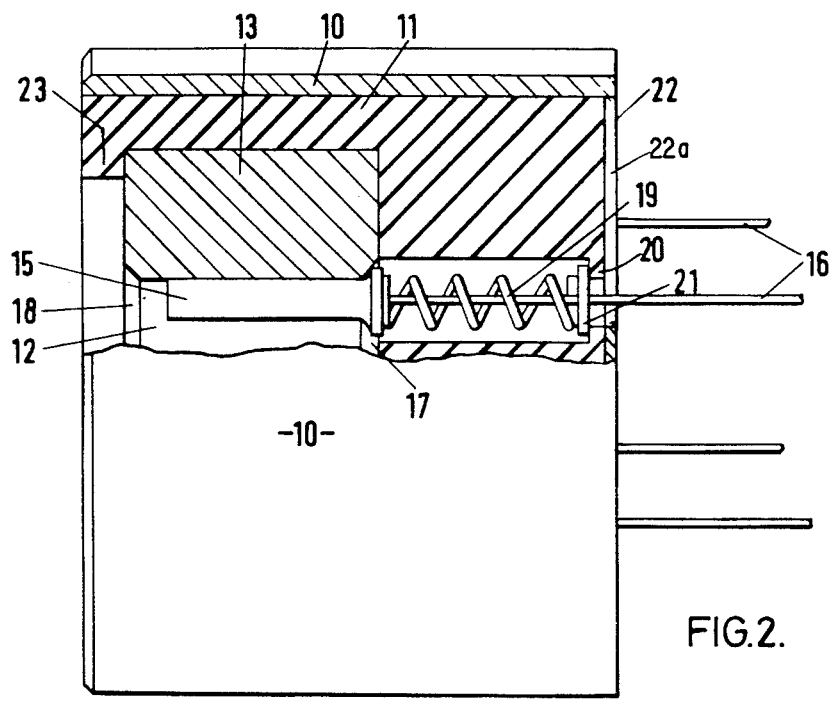
FIG. 2 is a partial longitudinal section taken along lines 2—2 of FIG. 1.

Referring to FIGS. 1 and 2, there is illustrated a connector member comprising a metal shell 10 provided with a silicone rubber resilient molding 11 lining its interior. The molding provides a housing for a set of locating rods comprising a central fully cylindrical rod 12 surrounded by six half cylindrical rods 13. The rods all have the same radius of curvature so that they nest together and define six equal sized tricuspid interstices 14 between the regions where their curved surfaces meet. The reason for using half cylinders for the rods 13, instead of full cylinders, is merely to reduce the overall diameter of the connector. Full cylinders could be used, if desired.

In each of the interstices 14 is fitted a metal ferrule 15, typically about 1.8 mm in external diameter, in which an optical fiber 16 is secured so that its end lies flush with the end of the ferrule and is centered on its axis. The ferrules have a slight interference or friction fit in their respective interstices, the rods being dimensioned to produce interstices for which the ferrules are typically 50 $\mu$m diameter oversize.

The rods 12 and 13 are provided with bevels 17 on their inner ends to facilitate insertion of the ferrules 15, while corresponding bevels 18 on their outer ends facilitate insertion of the ferrules of a mating connector member, to be described later.

The rubber lining 11 resiliently constrains the rods 13 against lateral movement relative to each other and, hence, resists separation of the engaging cylindrical surfaces of the rods. The resiliently constrained rods, therefore, precisely and reproducibly locate the ferrules 15 in the connector member.

The lining 11 provides a housing not only for the rods 12 and 13, but also for helical compression springs 19. These springs surround the optical fibers where they emerge from their ferrules and act between the flared ends of the ferrules and inwardly projecting flanges 20 around the apertures in the end wall of the molding. The springs are chosen to be strong enough to be able to overcome the friction between the rods and the ferrules and thus cause the ferrules to be urged deep into the interstices 14. A washer 21 at the rear end of each spring acts to spread the loading on the flange 20 by the spring. The flanges are supported by a backing plate 22 provided with a set of six radially arranged keyhole slots 22a extending to its periphery. The rounded ends of these slots register with the apertures defined by the flanges 20. The other portions of the slots are wide enough to admit the passage of an optical fiber.

The size and thickness of the flanges are chosen having regard to their strength and resilience so that if for some reason an assembly of fiber, ferrule, spring and washer is found to be faulty, it can be withdrawn from the mold and replaced. For this purpose, the backing plate 22 is temporarily moved some distance from the molding so that the fiber of the defective assembly can be disengaged from its slot and be replaced with the fiber of the replacement assembly.

A flange 23 of the front of the molding 11 prevents the springs 19 from acting through the ferrules to push the rods 13 out of the mold while rod 12 is held captive by the provision of an undercut hole (not shown) in its rear face which is engaged over the head of a co-operating boss (not shown) formed in the molding 11.

The connector member of FIGS. 1 and 2 is designed for use with a mating connector member having an equivalent number of fibers also terminating in ferrules similar to the ferrules 15. These ferrules of the mating connector member are protuberant so that when the two connector members are mated, the ferrules of the mating connector member become engaged in the interstices defined by the rods 12 and 13 causing the ferrules 15 to be pushed back against their springs until the butted ferrule ends lie somewhere near the middle of the interstices.

Figure 3:
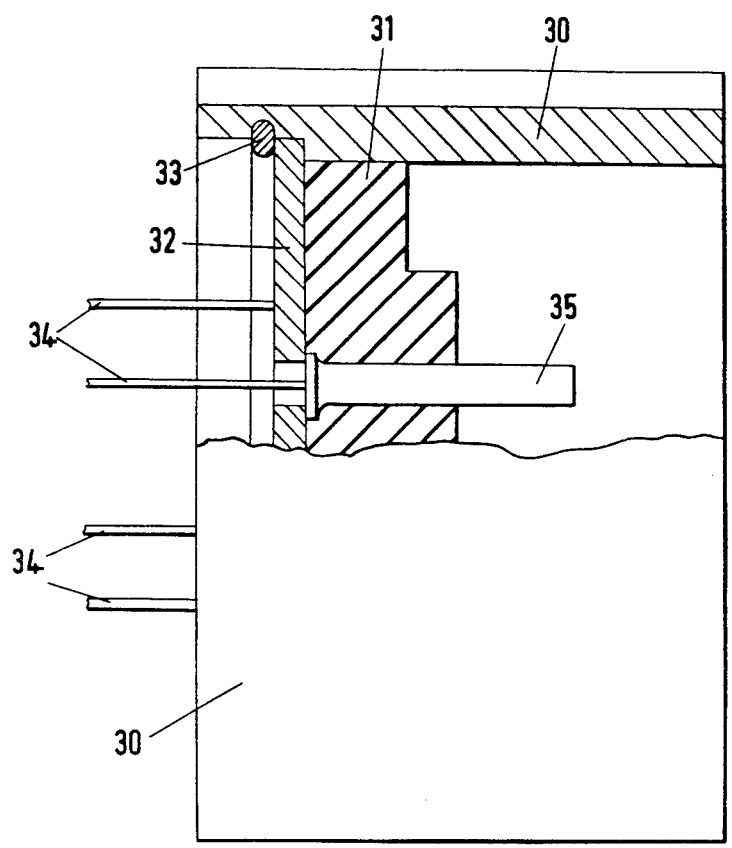
FIG. 3 is a partial longitudinal section of a mating connector member.

An example of a mating connector member is depicted in FIG. 3. The principal components of this connector member are a shell 30, a resilient silicone rubber molding 31, a keyhole slotted backing plate 32 held by a retaining clip 33, and a set of optical fibers 34 terminating in ferrules 35. The shell 30 engages over shell 10, and the two shells may be provided with polarizing parts, not shown, to insure that they can be mated in only one possible orientation. The molding 31 holds the ferrules 35 in approximately the right positions for engagement with the interstices 14. The final fine adjustment of their positions occurs when their ends engage the bevels 18. The molding is sufficiently flexible to accommodate this adjustment without causing any distortion of the ferrules. The ferrules 35 are carried forward into the interstices by the backing plate 32, and hence the rounded ends of its keyhole slots must be smaller than the flared ends of the ferrules. On the other hand, the rounded ends must be large enough to provide enough clearance for the fibers 34 taking into account the distance that they may be displaced when mated with the other connector. The other portions of the slots, which extend to the periphery of the plate 32, are wide enough to admit the passage of the fibers 34.

It is to be understood that by choice of different diameters of the alignment rods, it is possible to provide constructions of a multi-way connector having either more than six fibers or fewer than six. Where a relatively large number of ferrules is to be accommodated in a connector it may be preferable to depart from the geometry of alignment rod stack, comprising a single central rod surrounded by a single layer of outer rods, in favor of one having one or more intermediate layers. Another alternative is to have a stack having a group of three rods at the center instead of a single one. In any construction, it is not necessary for all the available tricuspid interstices to be occupied by ferrules.

What is claimed is:

1. An optical fiber multi-way connector member comprising:
    a rigid shell having an elastomeric lining therein;
    means comprising a plurality of aligned rods in said shell having cylindrical surfaces dimensioned to provide a plurality of tricuspid interstices that are each defined by the meeting together of three of said cylindrical surfaces;
    a plurality of optical fibers each secured inside a ferrule to terminate at one end thereof the fiber axis aligned with the ferrule axis;
    said ferrules being located in said tricuspid interstices in which they each have an interference fit;
    an apertured member secured to said shell behind said ferrules, the apertures in said member being aligned with said ferrules;
    a helical spring surrounding the fiber protruding from each said ferrule and acting between said apertured member and ferrule to bias said ferrule forwardly into its associated interstice; and
    said apertured member being sufficiently resilient to allow the insertion and withdrawal of the ferrules and their corresponding springs through its apertures.

2. An optical fiber connector member as set forth in claim 1 including:
    a removable backing plate fixed relative to said shell behind said apertured members, said plate embodying radial slots having inner ends registering with said apertures, said slots extending to the periphery of said plate and dimensioned to permit the passage of an optical fiber therethrough.

3. An optical fiber connector member as set forth in claim 1 wherein:
    said apertured member forms part of a molding providing a housing within said shell for said helical springs.

4. An optical fiber connector member as set forth in claim 3 wherein:
    said molding also provides said elastomeric lining for said aligned rods.

* * * * *